(12) United States Patent
Altonen et al.

(10) Patent No.: US 10,427,342 B2
(45) Date of Patent: *Oct. 1, 2019

(54) INJECTION MOLDING SYSTEM WITH DISCRETELY-ADJUSTABLE VARIABLE CONTROL

(71) Applicant: IMFLUX INC., Hamilton, OH (US)

(72) Inventors: Gene Michael Altonen, Hamilton, OH (US); Brian Matthew Burns, Mason, OH (US); H. Kenneth Hanson, III, Cincinnati, OH (US)

(73) Assignee: IMFLUX INC., Hamilton, OH (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/692,467

(22) Filed: Aug. 31, 2017

(65) Prior Publication Data
US 2018/0056567 A1    Mar. 1, 2018

Related U.S. Application Data

(60) Provisional application No. 62/382,335, filed on Sep. 1, 2016.

(51) Int. Cl.
*B29C 45/76*   (2006.01)
*B29C 45/77*   (2006.01)

(52) U.S. Cl.
CPC ............ *B29C 45/76* (2013.01); *B29C 45/766* (2013.01); *B29C 45/77* (2013.01);
(Continued)

(58) Field of Classification Search
CPC ......... B29C 45/03; B29C 45/76; B29C 45/77; B29C 2945/76006; B29C 2945/76033; B29C 2945/76066; B29C 2945/7611
(Continued)

(56) References Cited

U.S. PATENT DOCUMENTS 5,062,785 A * 11/1991 Stroud, III .............. B29C 45/76
  264/40.5
5,182,716 A *  1/1993 Stroud, III .............. B29C 45/76
  264/40.5
(Continued)

FOREIGN PATENT DOCUMENTS

DE       102013111257 B3   8/2014
EP           0531532 A1    3/1993
(Continued)

OTHER PUBLICATIONS

International Application No. PCT/US2017/049632, International Search Report and Written Opinion, dated Nov. 17, 2017.
(Continued)

*Primary Examiner* — Jacob T Minskey
*Assistant Examiner* — Cedrick S Williams
(74) *Attorney, Agent, or Firm* — Marshall, Gerstein & Borun LLP

(57) ABSTRACT

An injection molding machine uses a controller to effectively control its operation. The controller may determine and/or receive information regarding the machine's maximum load capacity, and may also determine a current operational load value of the machine. The controller also may determine a number of set points used to operate the machine. The controller may cause the machine to operate at these set points, thereby resulting in the machine operating at or below the maximum load value by adjusting any number of machine parameters associated with the injection molding machine.

16 Claims, 7 Drawing Sheets

(52) U.S. Cl.
CPC ............... *B29C 2945/76006* (2013.01); *B29C 2945/7612* (2013.01); *B29C 2945/76033* (2013.01); *B29C 2945/76056* (2013.01); *B29C 2945/76498* (2013.01); *B29C 2945/76531* (2013.01); *B29C 2945/76545* (2013.01); *B29C 2945/76561* (2013.01); *B29C 2945/76598* (2013.01); *B29C 2945/76605* (2013.01); *B29C 2945/76936* (2013.01); *B29C 2945/76949* (2013.01); *B29C 2945/76969* (2013.01)

(58) Field of Classification Search
USPC ........................................................ 264/40.1
See application file for complete search history.

(56) References Cited

U.S. PATENT DOCUMENTS

| | | | |
|---|---|---|---|
| 5,595,693 | A | 1/1997 | Fujita et al. |
| 5,738,809 | A | 4/1998 | Hara et al. |
| 6,108,587 | A | 8/2000 | Shearer et al. |
| 2002/0188375 | A1 | 12/2002 | Shioiri et al. |
| 2007/0069425 | A1* | 3/2007 | Klaus .................. B29C 45/5008 264/328.19 |
| 2007/0168079 | A1 | 7/2007 | Ludwig |
| 2010/0065979 | A1* | 3/2010 | Betsche .................. B29C 45/76 264/40.6 |

FOREIGN PATENT DOCUMENTS

| | | | |
|---|---|---|---|
| EP | 2027985 | A1 | 2/2009 |
| JP | 5-57777 | * | 3/1993 |
| JP | 2006231811 | A * | 9/2006 |
| WO | WO-99/41057 | A1 | 8/1999 |
| WO | WO-2009/026673 | A1 | 3/2009 |

OTHER PUBLICATIONS

International Preliminary Report on Patentability, corresponding International Application No. PCT/US2017/049632, dated Mar. 14, 2019.

Ishikawa et al., Intelligente regelung von vollelektrischen SG-maschinen, Kunststoffberater, 41(12):16-21 (1996).

* cited by examiner

| Cycle Phase | Energy Consumption | Last Cycle [KWh] | Reference [KWh] |
|---|---|---|---|
| Injection | | 0.084 | 0.000 |
| Reciprocating Screw | | 0.246 | 0.000 |
| Clamp Tonnage | | 0.033 | 0.000 |
| Packing/Holding | | 0.007 | 0.000 |
| Heating/Cooling | | 0.219 | 0.000 |
| Other | | 0.000 | 0.000 |
| Total | | 0.589 | 0.000 |

INJECTION MOLDING SYSTEM WITH DISCRETELY-ADJUSTABLE VARIABLE CONTROL

CROSS REFERENCE TO RELATED APPLICATIONS

This application claims the benefit of U.S. Provisional Application No. 62/382,335 (filed on Sep. 1, 2016), the entirety of which is incorporated by reference herein.

FIELD OF THE DISCLOSURE

The present application generally relates to injection molding and, more specifically, to approaches for adjustably operating an injection molding machine to reduce the energy required to form a molded article.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. The molten material is then forcefully injected into a mold cavity having a particular desired cavity shape. The injected plastic is held under pressure in the mold cavity and subsequently is cooled and removed as a solidified part having a shape closely resembling the cavity shape of the mold. A single mold may have any number of individual cavities.

Injection molding machines operate within manufacturer-provided constraints to ensure safety and operability of the machine. These machines are typically constrained by maximum load values which act to limit any number of operating parameters of the injection molding machine to ensure safe and effective operability and avoid damage to components of the injection molding machine. In the event that the manufacturer's safety margin level, as contrasted to the machine's actual maximum load value for a given set of operating and environmental conditions, is exceeded, the machine may overheat, trip to a failsafe setting, and/or trigger an alarm condition. The maximum load value may be represented graphically, and it may be dependent on any number of variables, such as, for example, equipment operating speeds, pressures, the type and viscosity of material(s) being molded, as well as environmental conditions. Because of the presence of maximum load values, the machine may be permanently configured to operate at or below particular variables regardless of whether the machine is operating above the maximum allowable load prescribed by the manufacturer.

Generally speaking, injection molding machines allow an operator to modify and/or manipulate the operating parameters thereof. As a merely illustrative, non-limiting example, if an environmental factor such as a plant ambient temperature causes the injection molding machine to work harder (i.e., consume more energy) to generate parts, the machine's operating load value over a given period of time will increase. This increase in the operational load value may eventually cause the machine to approach or exceed the maximum load value which may result in temporary or permanent machine failure. Prior to exceeding or even reaching this maximum load value, the machine may be pre-programmed to generate an alarm which prompts a machine operator to adjust operating variables as required to lower the operating load on the machine, or may trigger the machine to reduce or even cease molding operations altogether, i.e. trip to a safety mode.

Machines may be configured to provide a safety margin below a maximum machine load based on a "worst-case scenario," that is, when any number of parameters are present that would dramatically impact operability of the machine. The restrictions applied to the machines (e.g., safety factors) may restrict the machine from operating within a certain percentage of the maximum machine load. As a result, in operating conditions that resemble the worst-case scenario (such as environments with high ambient temperatures and/or pressures, materials having abnormally high viscosities, thus impacting flow speeds and cooling times, and the like), the machine is limited to performing at a level that is less than its peak performance. Similarly, even in the presence of operating conditions which are considered favorable or preferred, due to the fact that the manufacturer's pre-programmed safety factors are set with worst-case scenarios in mind, and are often not easily overridden, it is often the case that conventional injection molding systems do not approach peak efficiency outputs, even in the most ideal of operating conditions.

Frequently, injection molding machines are configured by the manufacturer to fix the range of adjustability of certain operator-adjustable parameters in an injection molding operation, or even prevent any operator adjustment of certain parameters, based on operator adjustment of other parameters. For instance, if an operator sets up an injection molding machine to implement molding operating program that contemplates injecting a viscous molten thermoplastic material at particularly aggressive velocity in a given portion of each injection molding cycle, the machine may be pre-programmed to only permit the injection molding machine's electric, hydraulic, servo-hydraulic, or servo-driven screw to accelerate at a conservative rate of acceleration, and/or to operate at a conservative pressure, based on the manufacturer's built-in safety margin below the machine's actual load capacity.

SUMMARY

Embodiments within the scope of the present disclosure are directed to the use of a controller or controllers capable of effectively controlling operation of an injection molding machine, which may be a previously-installed machine or an original equipment manufacturer (OEM) injection molding machine. The controller(s) may determine and/or obtain information regarding the machine's maximum load capacity based at least in part on any number of critical design limitations, and may also determine an instantaneous (or at least periodic) present load value on the machine. The controller(s) may determine, calculate, or otherwise identify any number of critical design limitations and determine a number of discrete set points in which the machine can be operated that fall below the critical design limitations. The controller(s) of the present disclosure may allow the machine to be operated at or near the maximum load value by adjusting any number of machine parameters according to each of the discrete set points, and can dynamically adjust the range within which operator-adjustable parameters in an injection molding operation may be manipulated to facilitate, or at least permit, operation of the injection molding machine in a manner that exploits the machine's actual load capacity during the course of its operation, thereby increasing efficiency and output. In response to operator adjustment of various injection molding operating parameters, rather than constrain other operating parameters to tight ranges or preventing adjustment beyond conservative manufacturer-set safety margins, the controller(s) of the present disclosure permits conventionally-fixed parameters to float in a manner that allows the injection molding machine to operate at, or near, its maximum load capacity at the new operating conditions (which may include both machine conditions and environmental conditions).

In many embodiments of the present disclosure, the controller(s) may be adapted to selectively operate the injection molding machine in a manner that allows the current load value to remain, on average (e.g., a time loaded average), below the maximum load value over a specified period of time. By adjusting any number of operating parameters, the machine is capable of reacting to changing conditions, some of which may occur during the middle of a cycle, in a near-instantaneous manner, thus effectively maximizing machine efficiency and producing the maximum number of parts possible over a given period of time. Additionally, because the controller is adapted to monitor the machine in real-time, an operator need not actively monitor and/or adjust the machine's parameters on the fly.

In these embodiments, the controller may first enter into a learning mode, during which an initial or reference load value or curve is obtained. In some of these examples, the initial load value is input or downloaded to the controller by a manufacturer prior to the system being installed in its operating environment. In other examples, the initial load value is calculated in the environment and is based on a first set of parameters and/or operating variables, and represents an estimated maximum load value the injection molding machine can maintain over a given period of time while avoiding failure. The controller then calculates a modified load value by operating the injection molding machine based on a second set of operating variables. This second set of parameters may be values that are anywhere between approximately 0.1 to 50%, preferably 0.1 to 25%, more preferably 0.1 to 15%, even more preferably 0.1 to 10%, and most preferably 0.1 to 5%, including any integer or non-integer percentage within these ranges, away from the parameters used to calculate the initial load value. The load values may be calculated using a root-mean-square approach or any other suitable method.

Using the initial and modified load values as well as the first and second set of operating parameters, a reference (or maximum) load curve for that particular injection molding system may be generated. For instance, a computer program associated with the controller may be provided that interpolates load values between the measured initial and modified load values for any operating conditions intermediate the first and second operating conditions, and extrapolates load values for operating conditions outside of the first and second operating conditions. Alternately, a reference or maximum load curve may be provided by the machine manufacturer or by the provider of the equipment, may be a theoretical value based on a predetermined maximum operating condition, and/or may be obtainable by other means.

The operating parameters may be any combination of adjustments to the injection molding machine, and may include environmental conditions, some of which may be within the control of the molder, such as ambient temperature in a temperature-adjustable manufacturing facility, but some may be outside of human control, such as barometric pressure. In some approaches, variations in operating parameters may include adjustments to a barrel temperature, a clamp closing speed, a clamp opening speed, a cooling time, an inject forward time, an overall cycle time, a pressure setpoint, a screw recovery speed, and a screw velocity. Other examples are possible and may be dependent on the particular injection molding machine in use.

After determining or otherwise obtaining the reference load curve, the controller may then obtain a plurality of discrete set points along the reference load curve. These set points are constrained by critical design elements or limitations which are depicted as extremes or near-extremes on the reference load curve. These limitations represent conditions in which the machine cannot exceed on any circumstances, otherwise machine failure would occur. The controller can select any number of discrete set points to be used to operate the machine. The discrete set points can be obtained by the machine by adjusting any number of machine parameters described herein. In some examples, between two and ten set points may be used. Other examples are possible.

Upon the machine entering an operational mode, the controller selectively operates the machine by designating any one of the discrete set points at which to operate. The controller can change set points at any time, and an operator may also explicitly select a set point. By adjusting the various operating parameters, an operational load value of the machine may be maintained below the reference load curve. During operation of the machine, the controller is adapted to actively (e.g., periodically) monitor the load values to ensure the operational load on the machine remains below values of the reference curve. The controller is further adapted to adjust the operating variables by switching to a different discrete set point as needed to ensure the operating load value remains below the reference load values.

In many of these examples, the controller may selectively control how closely the operational load is kept to the reference load curve by adjusting the operating parameters described herein. For example, depending on the particular application, the operational load may be held to within approximately 0.1-50% of the maximum load value, or any integer or non-integer value for percentage in that range, or any range formed by any of those integer values, such as 0.1-30% or from 0.1-25%, 0.1-10%, or 0.1-5%.

The controller can be any type of controller, such as an electro-mechanical controller, a circuit board, a programmable logic controller, an industrial computer, or any other type of controller as described herein or as known in the art. The controller may be set, configured, and/or programmed with logic, commands, and/or executable program instructions according to the embodiments provided herein or as known in the art.

In embodiments where multiple controllers are used (e.g., a native controller and a retrofit controller which overrides operation of the machine), the retrofit controller is adapted to establish signal communication between the retrofit controller and the injection molding machine such that the retrofit controller at least partially controls operation of the machine. Thus, the retrofit controller may connect one or more outputs from any number of sensors (e.g., pressure sensors, temperature sensors, position sensors, and the like) disposed on or near the machine to one or more inputs of the retrofit controller. Connecting the retrofit controller may also include disconnecting one or more of the existing sensor outputs from the native controller and connecting those existing sensor outputs to the retrofit controller, or adding more outputs to one or more of the existing sensors and connecting those added outputs to the retrofit controller, or combinations of these. Connecting the retrofit controller can involve one or more existing sensors already in place on the molding machine, or moving one or more existing sensors to new locations on the molding machine, or installing one or more new sensors on the molding machine, or combinations of these. The signal communication can be any kind of signal (e.g. hydraulic, pneumatic, mechanical, analog electrical, digital electrical, optical, etc.) described herein or known in the art. In some embodiments, the retrofit controller can replace the native controller and replace all of its functions. In other embodiments of retrofitting, the retrofit controller can be added as an addition to the native controller and replace less than all of its functions. In alternative embodiments, a native controller can be reconfigured to become a retrofit controller, as described herein.

Any or all of the embodiments described in this Summary section can be performed in any way disclosed herein or known in the art, and can be used and/or combined in any workable combination, including any alternative embodiments.

BRIEF DESCRIPTION OF THE DRAWINGS

The above needs are at least partially met through provision of the injection molding machine with discretely-adjustable variable control described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
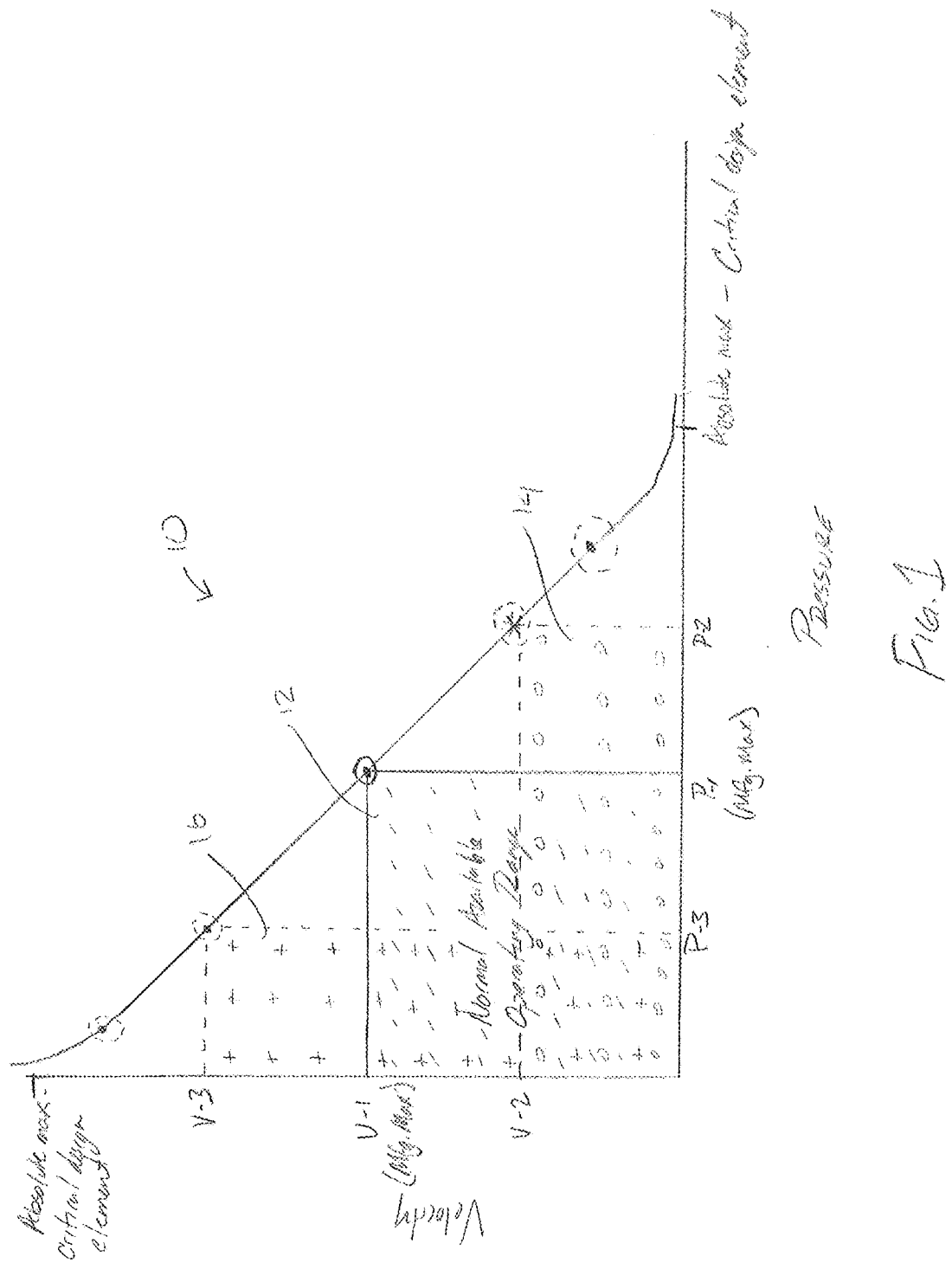
FIG. 1 illustrates an exemplary machine loading profile in which an injection molding machine's screw velocity is plotted as a function of pressure in accordance with various embodiments of the present disclosure.

Turning now to the drawings, an injection molding process is herein described. Injection molding machines (also referred to herein simply as "machines") have a generally nonlinear reference or maximum loading curve 10 as illustrated in FIG. 1. This curve 10 may be viewed as a graphical representation of an effect that any number of parameters or "critical design elements" (such as, for example, velocity as a function of operating pressure), may have on the machine. Generally speaking, operators run these machines at operating load values (which may fluctuate over time) that are at a point well below the reference load curve to avoid tripping the injection molding machine manufacturer's pre-programmed alarms and/or failure modes. As FIG. 1 illustrates, injection molding machines typically have absolute maximum operating values that are dependent on the critical design element or elements which may not be exceeded so as to limit potential machine failure.

Machine manufacturers utilize safety buffers which act to restrict parameters from exceeding particular values that are lower than that which would cause the machine to operate to its absolute maximum operating load capacity. As illustrated by FIG. 1, points P-1 and V-1 represent specified manufacturing maximum values that may not be exceeded. These values are programmed into a native controller that at least partially controls operation of the machine. As a result of these restrictive values, the typical available operating range 12 (as depicted by the slashed shaded area in FIG. 1) is available for use by the operator, meaning the operating parameters may fall somewhere in this area.

However, the machine may still be operated using parameters that are greater than the manufacturer's designated maximums without causing damage to the injection molding machine. In the examples provided herein, operating parameters such as the maximum pressure are selectively increased (while remaining below the machine's specified absolute maximum operating velocity value) in order to increase the available operating range 14 (depicted by area having circles in FIG. 1). This range 14 generally depicts parameters used to create thin walled components. Similarly, the maximum velocity may be selectively increased (while remaining below the machine's specified absolute maximum operating velocity value) in order to increase the available operating range 16 (as depicted by the area having crosses in FIG. 1). Any number of parameters may be adjusted in this way to increase the allowable operating range of the machine. Ultimately, the entire area under the maximum load curve (up to the machine's specified absolute maximum or critical operating element parameter values) may be used.

As depicted in FIG. 1, any number of discrete operating set points located along the maximum load curve can be selected using any number of approaches. These operating points may be evenly distributed along the curve, or can be distributed in any desired manner based on the particular machine's operating characteristics. For example, if it is desired that a machine be designed to operate at high velocities with little need for high pressure operation, a number of discrete set points will be selected on the high velocity side of the curve.

To enable operating parameter values beyond the manufacturer's preprogrammed maximums, a retrofit controller can be used to intercept and alter and/or generate new control signals that are sent to the injection molding machine. The retrofit controller may include software that communicates with the native controller to "trick" the native controller into believing operating parameters are still within the manufacturer's maximum allowed values while in reality, different control signals are being sent to the machine. In some examples, the retrofit controller may suspend or intercept control signals originating from the native controller and generate new signals to send to the machine. Other examples are possible, and further discussion of the retrofit controller is provided herein.

Figure 2:
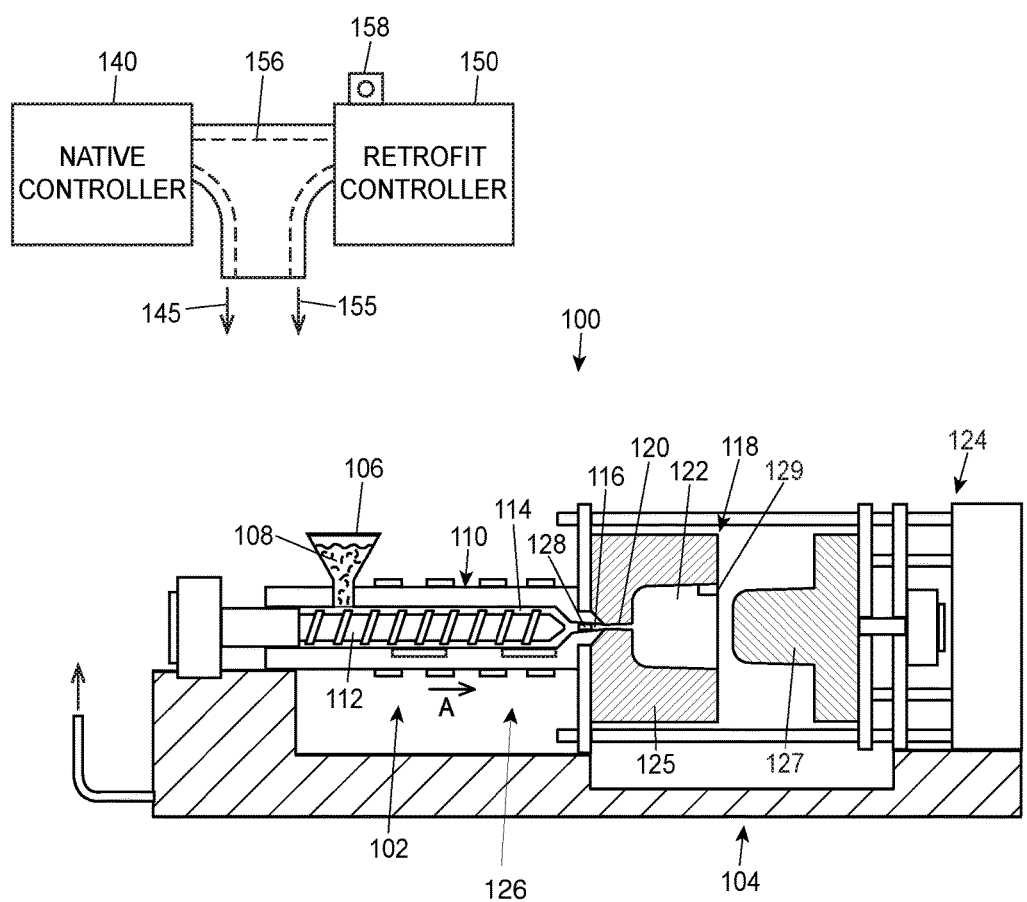
FIG. 2 illustrates an elevation view of an exemplary injection molding machine having multiple controllers coupled thereto in accordance with various embodiments of the present disclosure.

While any number of approaches may be used to form parts, the injection molding machine described herein is merely exemplary and is not intended to limit the applicability of inventive concepts in any way. The approaches described herein may be suitable for electric presses, servo-hydraulic presses, and other known machines. As illustrated in FIG. 2, the retrofitted injection molding machine 100 includes an injection unit 102 and a clamping system 104. The injection unit 102 includes a hopper 106 adapted to accept material in the form of pellets 108 or any other suitable form. In many of these examples, the pellets 108 may be a polymer or polymer-based material. Other examples are possible.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range of about 130° C. to about 410° C.

The reciprocating screw 112 advances forward and forces the molten plastic material 114 toward a nozzle 116 to form a shot of plastic material which will ultimately be injected into a mold cavity 122 of a mold 118 via one or more gates 120 which direct the flow of the molten plastic material 114 to the mold cavity 122. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components.

Once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 125, 127, which are then separated from one another. The finished part may then be ejected from the mold 118. The mold 118 may include any number of mold cavities 122 to increase overall production rates. The shapes and/or designs of the cavities may be identical, similar, an/or different from each other.

In examples where the injection molding machine is retrofitted, the machine 100 also includes a native controller 130 which is communicatively coupled with the machine 100 via connection 132. The connection 132 may be any type of wired and/or wireless communications protocol adapted to transmit and/or receive electronic signals. In these examples, the native controller 130 is in signal communication with at least one sensor, such as sensor 128 located in the nozzle 116 and/or a sensor 129 located proximate an end of the mold cavity 122. Any number of additional sensors may be placed at desired locations of the machine 100.

The native controller 140 can be disposed in a number of positions with respect to the injection molding machine 100. As examples, the native controller 140 can be integral with the machine 100, contained in an enclosure that is mounted on the machine, contained in a separate enclosure that is positioned adjacent or proximate to the machine, or can be positioned remote from the machine. In some embodiments, the native controller can partially or fully control functions of the machine via wired and/or wired signal communications as known and/or commonly used in the art.

The sensor 128 may be any type of sensor adapted to measure (either directly or indirectly) one or more characteristics of the molten plastic material 114 located in the nozzle 116. The sensor 128 may measure any characteristics of the molten plastic material 114 that is known in the art, such as, for example, pressure, temperature, viscosity, flow rate, and the like, or any one or more of any number of additional characteristics which are indicative of these. The sensor 128 may or may not be in direct contact with the molten plastic material 114. In some examples, the sensor 128 may be adapted to measure any number of characteristics of the injection molding machine 100 near the nozzle 116 and not just those characteristics pertaining to the molten plastic material 114.

The sensor 128 generates a signal which is transmitted to an input of the native controller 140. If the sensor 128 is not located within the nozzle 116, the native controller 140 can be set, configured, and/or programmed with logic, commands, and/or executable program instructions to provide appropriate correction factors to estimate or calculate values for the measured characteristic in the nozzle 116.

The sensor 129 may be any type of sensor adapted to measure (either directly or indirectly) one or more characteristics of the molten plastic material 114 to detect its presence and/or condition in the mold cavity 122. In various embodiments, the sensor 129 may be located at or near an end-of-fill position in the mold cavity 122. The sensor 129 may measure any number of characteristics of the molten plastic material 114 and/or the mold cavity 122 that is known in the art, such as pressure, temperature, viscosity, flow rate, or one or more of any other characteristics that are indicative of any of these. The sensor 129 may or may not be in direct contact with the molten plastic material 114.

The sensor 129 generates a signal which is transmitted to an input of the native controller 140. If the sensor 129 is not located at the end-of fill position in the mold cavity 122, the native controller 140 can be set, configured, and/or programmed with logic, commands, and/or executable program instructions to provide appropriate correction factors to estimate or calculate values for the measured characteristic at the end-of-fill position. Any number of additional sensors may be used to sense and/or measure operating parameters.

The native controller 140 is also in signal communication with the screw control 126. In these embodiments, the native controller 140 generates a signal which is transmitted from an output of the native controller 140 to the screw control 126. The native controller 140 can control any number of characteristics of the machine, such as, for example, injection pressures (by controlling the screw control 126 to advance the screw 112 at a rate which maintains a desired melt pressure of the molten plastic material 114 in the nozzle 116), barrel temperatures, clamp closing and/or opening speeds, cooling time, inject forward time, overall cycle time, pressure setpoints, screw recovery speed, and screw velocity. Other examples are possible.

The signal or signals from the native controller 140 may generally be used to control operation of the molding process such that variations in material viscosity, mold temperatures, melt temperatures, and other variations influencing filling rate are taken into account by the native controller 140. Adjustments between set points may be made by the native controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The native controller 140 may be connected to the sensors 128, 129, the screw control 126, and or any other components in the machine 100 via any type of signal communication known in the art.

Figure 3:
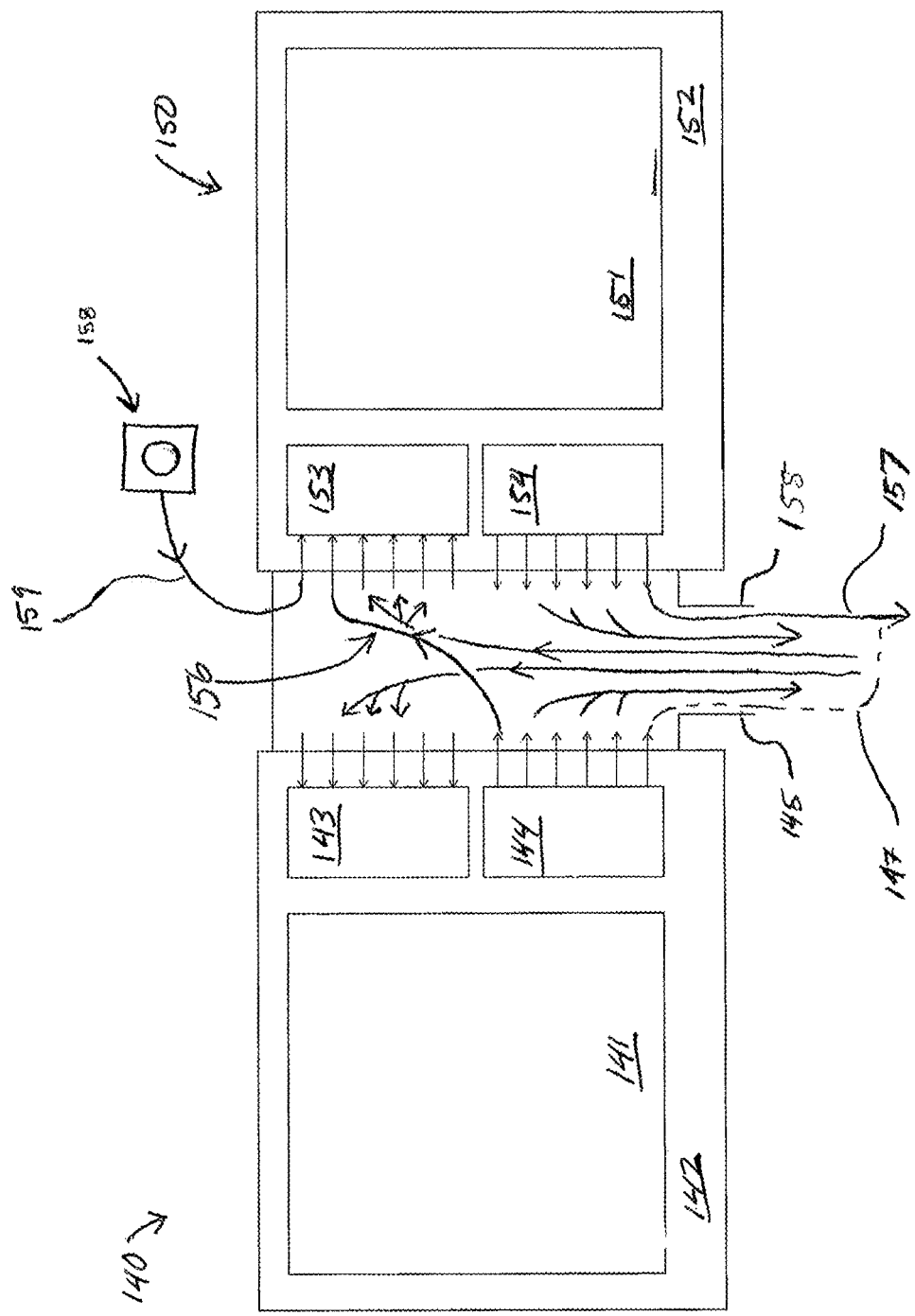
FIG. 3 illustrates portions of a control mechanism having a native and a retrofit controller capable of selecting discrete set points in accordance with various embodiments of the present disclosure.

As illustrated schematically in FIGS. 2 and 3, the retrofit controller 150 is generally similar to the native controller 140. The retrofit controller 150 is electrically coupled to the native controller 140 via any number of methods such that the retrofit controller 150 and the native controller 140 are in signal communication. The retrofit controller 150 is adapted to control operation of the injection molding machine 100 directly and/or by controlling the output of the native controller 140.

The native controller 140 includes software 141 adapted to control its operation, any number of hardware elements 142 (such as a memory module and/or processors), any number of inputs 143, any number of outputs 144, and any number of connections 145. The software 141 may be loaded directly onto a memory module of the native controller 140 in the form of a non-transitory computer readable medium, or may alternatively be located remotely from the native controller 140 and be in communication with the native controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the native controller 140. The hardware 142 uses the outputs 144 to send signals, data, and/or other information to the injection molding machine. The connection 145 represents a pathway through which signals, data, and information can be transmitted between the native controller 140 and its injection molding machine 100. In various embodiments this pathway may be a physical connection or a non-physical communication link that works analogous to a physical connection, direct or indirect, configured in any way described herein or known in the art. In various embodiments, the native controller 140 can be configured in any additional or alternate way known in the art.

The retrofit controller 150 includes components that are similar to those of the native controller 140, such as a software 151 adapted to control its operation, any number of hardware elements 152 (such as a memory module and/or processors), any number of inputs 153, any number of outputs 154, and any number of connections 155. The software 151 may be loaded directly onto a memory module of the native controller 150, or may alternatively be located remotely from the native controller 150 and be in communication with the native controller 150 via any number of controlling approaches. The software 151 includes logic, commands, and/or executable program instructions which may contain logic and/or commands for controlling the injection molding machine 100 according to discrete set points. The maximum allowable operating parameters are no longer fixed to a single, permanent value and may be variable according to the number of discrete set points.

The connection 145 is illustrated as being in common with a connection 155, wherein the common connection represents a pathway through which signals, data, and information can be transmitted: a) between the retrofit controller 150, the native controller 140 and the injection molding machine 100, b) between the retrofit controller 150 and the injection molding machine 100, and c) between the retrofit controller 150 and the native controller 140. In various embodiments these pathways may be physical connections or non-physical communication links that work analogous to physical connections, direct or indirect, configured in any way described herein or known in the art. In various embodiments, the native controller 140 and the retrofit controller 150 can be configured in any additional or alternate way known in the art.

FIG. 3 illustrates connecting a particular output 144 from the native controller 140, which is used as a particular input 153 to the retrofit controller 150. In various embodiments disclosed herein, the retrofitting of the injection molding machine 100 includes establishing signal communication between: a) an inject forward output 156 from outputs 144 of the native controller 140, and b) one of the inputs 153 of the retrofit controller 150. The native controller 140 can be set, configured, and/or programmed with logic, commands, and/or executable program instructions such that the inject forward output 156 signals when the plastic injecting should (and/or should not) occur during a mold cycle of the molding machine 100.

As an example, the native controller 140 can turn "on" the inject forward output 156 when the plastic injecting should occur, and can turn "off" the inject forward output 156 when the plastic injecting should not occur. The retrofit controller 150 can use the state of the inject forward output 156 as a condition for injecting plastic in the mold cycle. This signal communication allows the native controller 140 to hand-off control of the plastic injection to the retrofit controller 150 for the plastic injecting portion and/or any other portion of the mold cycle. In various embodiments, the function of the inject forward output 156 can be accomplished by the native controller 140 sending to the retrofit controller 150 one or more additional or alternate signals, data, and/or information, which are equivalent to an inject forward output 156, using any known approaches in the art.

FIG. 3 further illustrates moving a particular output from the native controller 140 to the retrofit controller 150. In various embodiments disclosed herein, the retrofitting includes: a) disconnecting signal communication between an injection control output 147 of the native controller 140 and a control input of an injection unit of the molding machine 100 (signal illustrated by a phantom line), and b)

establishing signal communication between an injection control output 157 of the retrofit controller 150 and the control input of the injection unit of the molding machine 100 (signal illustrated by a solid line). The retrofit controller 150 can be set, configured, and/or programmed with logic, commands, and/or executable program instructions such that the injection control output 157 signals the injection unit regarding the rate at which injecting should occur during plastic injecting of a mold cycle of the molding machine.

As an example, the retrofit controller 150 can generate the injection control output 157 as an analog control voltage, which scales from a particular low value (representing a minimum injection rate) to a particular high value (representing a maximum injection rate). The injection unit can use the state of the inject control output 157 as the input for controlling the rate of injecting plastic in the mold cycle. The rate of injecting, in turn, directly affects operating values such as the injection pressure of the molten plastic in the machine 100. As a result, the injection control output 157 can effectively be used to control injection pressures in the retrofitted injection molding machine 100, according to any of the embodiments disclosed herein. This signal communication also allows the retrofit controller 150 to replace control of the plastic injection by the native controller 140 in the mold cycle. In various embodiments, the function of the injection control output 157 can be accomplished by the retrofit controller 150 generating one or more additional or alternate signals, data, and/or information, which are equivalent to an injection control output, and sending such to one or more additional or alternate machine components, which partially or fully control operating parameters of the machine 100 in any way known in the art. For example, in one alternative embodiment, the retrofit controller 150 may at least partially control injection pressures of the machine 100 by controlling a rate of melt flow through the nozzle 116. In various embodiments, the retrofitting can also include rerouting the disconnected injection control output 147 to one of the inputs 153 of the retrofit controller 150. Other examples are possible.

The injection molding machine 100 may also include a disable switch 158, which can be provided with the retrofitting, as described herein. The disable switch 158 can allow a user of the retrofitted injection molding machine to select a mode of injection molding that disables the retrofit controller 150 such that the machine 100 and the native controller 140 mold production versions (i.e. parts made using production conditions on the molding machine 100, wherein the parts have acceptable part quality) of the plastic part according to the original mold cycle. In various embodiments disclosed herein, the retrofitting process includes establishing signal communication between: a) a user-controlled output 159 from the disable switch 158, and b) one of the inputs 153 of the retrofit controller 150. The retrofit controller 150 can be set, configured, and/or programmed with logic, commands, and/or executable program instructions such that when the user-controlled output 159 provides a particular signal, the retrofit controller 150 does not control plastic injecting during a mold cycle of the molding machine 100.

As an example, when the user-controlled output 159 is turned "on," the injecting function of the retrofit controller 150 is disabled and does not control the plastic injecting, and when the user-controlled output 159 is turned "off," the injecting function of the retrofit controller 150 is not disabled and does control the plastic injecting. The retrofit controller 150 can also be set, configured, and/or programmed with logic, commands, and/or executable program instructions such that when the injecting function of the retrofit controller 150 is disabled, the retrofit controller 150 can receive the control output 147 from the native controller 140 (as described above) and pass that received signal to the control input of the injection unit of the molding machine 100. As a result, when the injecting function of the retrofit controller 150 is disabled, the native controller 140 can effectively control the plastic injecting (with the passed through signal) and the retrofitted molding machine 100 can still operate, although using an original mold cycle which is likely to be relatively less efficient than the present mold cycle. In various embodiments, the function of the disable switch 158 and the user-controlled output 159 can be accomplished by one or more additional or alternate user input devices and/or signals, data, and/or information which are equivalent, in any workable way known in the art.

Figure 4:
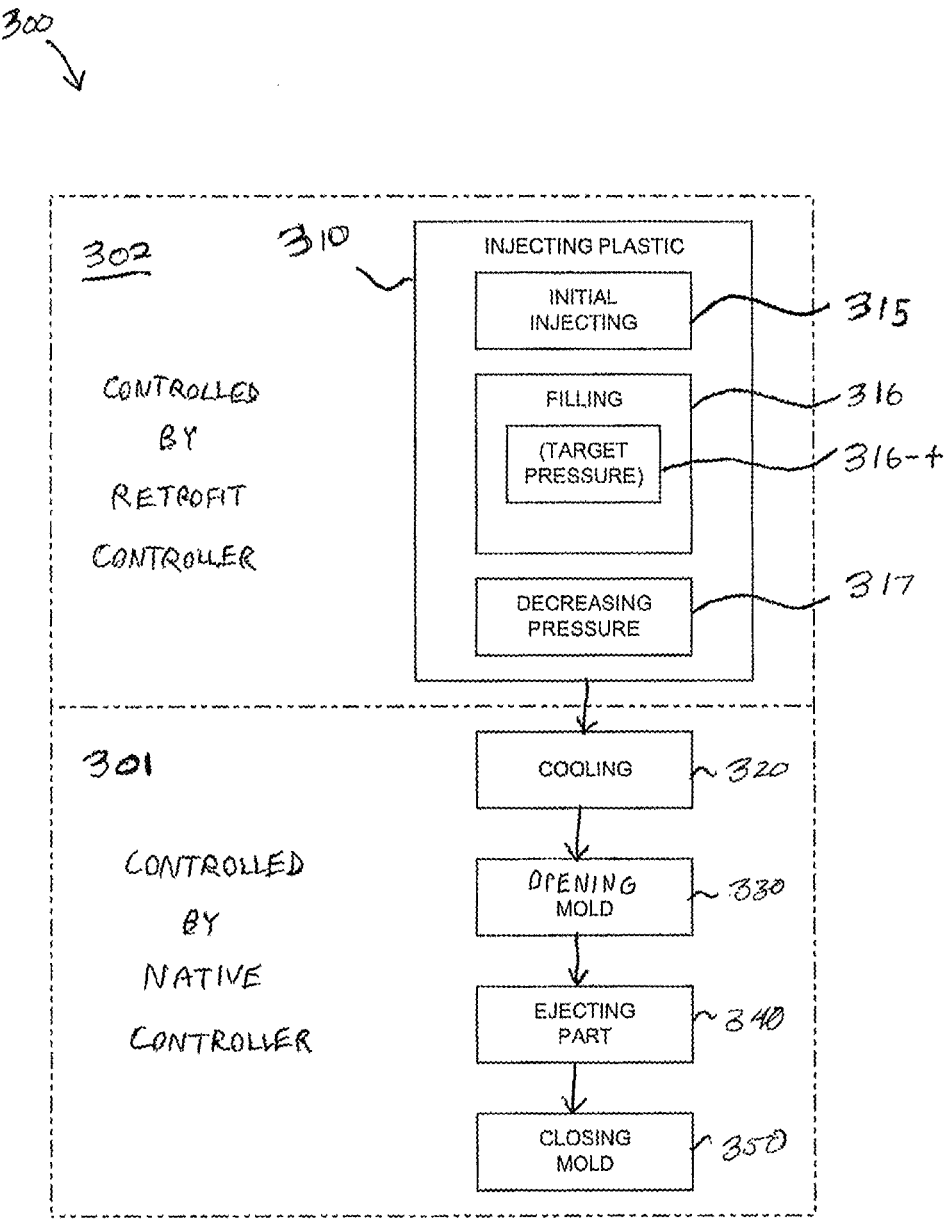
FIG. 4 illustrates a retrofit injection mold cycle as programmed to the control mechanism to control the injection molding process in accordance with various embodiments of the present disclosure.

FIG. 4 provides an illustration of a retrofit injection mold cycle 300 as programmed on the native controller 140 and the retrofit controller 150 of FIGS. 2 and 3, for controlling the injection molding machine 100. The retrofit mold cycle 300 includes an operating sequence of injecting molten plastic 310, according to control 302 by the retrofit controller 150, and subsequently performing other functions according to control 301 by the native controller 140. The injecting of the molten plastic 310 includes an initial injecting portion 315, a filling portion 316, which includes using a target pressure 316-$t$, and a decreasing pressure portion 317. The native controller 140 and retrofit controller 150 can use various signal communications, as described herein and known in the art, to share control of the retrofitted injection molding machine 100 during the retrofit mold cycle. The injecting of the molten plastic 310 can be partially or fully performed in any way described herein for a retrofit mold cycle. The other functions of the cycle include cooling the plastic 320, opening the mold 330, ejecting the part from the mold 340, and closing the mold 350. Any number of additional functions may be performed by either the retrofit controller 150 and/or the native controller 140.

In order to run the retrofit injection mold cycle, machine load values must be determined and/or calculated for the injection loading machine 100, preferably in real time, continuously, semi-continuously, periodically, or at least one or a plurality of locations during the course of an injection molding cycle.

In some embodiments, maximum and/or reference load values for the machine 100 are provided by the manufacturer and/or are readily obtainable and input onto the controller 140. In these examples, the maximum load values can be based on a critical design element which determines an upper operating limit. Examples of critical design elements can include particular components (e.g., hydraulic hoses, hydraulic motor blocks, screw and/or check valves, and check rings) having designated pressure limitations. In order to operate the machine at higher levels, it must be verified that the components can withstand the increase in operational load. Similarly, a maximum pressure alarm may be incorporated into the system coupled to an equipment shut-off mechanism which will disable the equipment when clamp tonnage or pressure limitations are exceeded. If it is desired to operate the machine at increased operational levels, the equipment alarms must be modified accordingly.

When preparing the environment and determining appropriate systems to be used, properties of the injection molding machine must be taken into account while reviewing a specified part design and cavity guidelines. Some machines are designed for the production of particular parts (e.g., thin wall parts), whereas other machines can be used to produce various parts. The critical design element is typically based on a maximum velocity (e.g., a motor limitation, bearing or other component failure) and/or a maximum pressure allotment. Other examples are possible. Generally speaking, machine velocity and pressure limitations on each shot (that is, the volume of material used to fill the mold cavity) is dependent on the part design and equipment limitations. Selecting an injection molding machine having a shot capacity equal to approximately twice the expected shot size of the part typically provides a suitable variable processing window. Further, selecting an appropriate clamping tonnage can be an important design consideration. Generally speaking, tonnage between 3 and 6 tons/in$^2$ is sufficient for the production of most products. Any suitable values and/or parameters may be used in designing the system.

In other examples, the maximum load may be calculated by causing the injection molding machine 100 to enter a learning mode during which an initial load value is calculated based on operating the machine 100 according to a first defined set of parameters. Accordingly, this first set of parameters would be interpreted as a "maximum loading" value. A modified load value is then calculated by operating the machine 100 according to a second defined set of parameters. In some examples, the loading may be increased by a specified percentage to reach an absolute maximum loading of the machine. By modifying the parameters to the second defined set, a relative weighting of what each factor contributes to the overall loading of the machine can be determined. As an example, by increasing the cooling time by a specified percentage, the amount the machine loading changes can be calculated. The second set of parameters can be experimentally determined to understand the maximum amount of change that is allowable before a noticeable degradation in part quality is observed. As a result, in some embodiments, a suitable operating range for each parameter is determined and thereafter used to form satisfactory parts.

This second defined set of parameters can differ from the first defined set of parameters, preferably by at least approximately 5-35% in order to allow the reference load curve to be optimally interpolated and extrapolated. The retrofit controller 150 and/or the native controller 140 then generates and stores a reference load curve that is based on the first and second operating parameters via extrapolation and/or any other suitable method. For example, the parameters may be determined via an iterative, "closed-loop" process known in the art. In these examples, limits and operating instructions must be established and provided so the controller can "learn" how far the parameters may be changed to maintain safe operation of the injection molding machine. In further embodiments, dependent variables may be added where modifying any number of variables may result in other variables automatically changing to stay within the established limits.

In some examples, it may be necessary to identify operating speed, torque settings, estimated load values, the particular machine geometry (e.g., screw pitch or other details), and the type of plastic being used. Other variables may also need to be identified. The reference load curve may be calculated via any other suitable method known in the art such as by experientially monitoring system performance at a peak period of time and storing and using these values as maximums. In other approaches, the maximum load value may be a theoretical value based on the motor and/or drive specifications for a given injection molding machine.

Next, absolute limits or critical design elements are determined for the curve as previously described. These limits will act as operational constraints in which the machine cannot exceed under safe operation. A number of discrete operating set points are selected between these limits. In some examples, a first central set point can be recommended and/or provided by the manufacturer. Accordingly, any number of additional set points can be determined which fall on either side of the central set point. In some examples, the set points are equally distributed along the load curve, and in other examples, the set points are distributed unequally, randomly, or in any other desired manner to provide for control of the machine in a desired manner. For example, if a particular machine exhibits operating efficiencies at or near a particular location along the load curve, the discrete operating set points may be set near this range to take advantage of the efficiency. Other examples are possible.

Upon determining and/or establishing any number of set points, the learning mode is complete, and the injection molding machine 100 is placed in an operational mode wherein it is operated in a manner that in which an average load value does not exceed the maximum load value over a given time but may approach the maximum load value to obtain peak efficiency. In other words, the machine 100 may temporarily operate at values which are above the maximum load value, but over a given time, the average load value over the course of that interval will be below the max load value. This average load value over the course of an interval that is all or some fractional portion of the load value over a single cycle is referred to herein as an "average operational load value of the injection molding machine." Alternately, the learning mode may remain open and the reference or maximum load curve could continually or periodically be regenerated based on new reference load data. If the operational load value were to exceed the maximum load value, the machine 100 may overheat, risk damage to one or more of its components, and/or fail.

The machine 100 may be adapted to accept a user input designating how close an operational load must be to the maximum load allowable by the machine. In some embodiments, a user may wish to operate the machine 100 within approximately 50% and approximately 100% of the maximum load at all times, without exceeding the maximum load at any time.

In preferred embodiments, the machine may be configured to operate at any numerical value between approximately 60-99% of the machine's maximum load. If the operational load falls outside of this range, the retrofit controller 150 is adapted to selectively control operation of the machine by switching to a different set point to cause the operational load to be within this range, with a pre-programmed hierarchy of operational parameter adjustments to be made to bring the machine back within the desired range. In some examples, sensors 128, 129 and/or any other devices may determine values associated with the machine's 100 operation and transmit these data to the native controller 140 and/or the retrofit controller 150. The current operating values are then compared to the reference load curve to determine whether the machine is operating within the desired range.

In some embodiments, any or all of the initial load value, the modified load value, and/or the current operational load value are calculated using a root-mean-square (or RMS) calculation in which the operating current and/or voltage values are periodically measured to determine a mean value. Power consumption can be measured using any number of approaches known in the art such as, for example, by using current/voltage probes. To measure power consumption, RMS voltage and RMS current are calculated and multiplied together. The power consumption may also be calculated using the following formula:

$$\text{POWER} = \text{SQRT}(I_0^2 + I_1^2 + I_2^2 + \ldots I_n^2) * \text{SQRT}(V_0^2 + V_1^2 + V_2^2 + \ldots + V_n^2)$$

where $I_n$ and $V_n$ represent scans of the processor. If these values are calculated at a high enough rate, a machine's power loading may be provided. This calculation is then reset or repeated with each given shot or segment of control of interest (for example, the injection phase, the hold phase, the recovery phase, etc.). In other examples, a machine capacity load calculation or any other calculation known in the art may be used to determine the machine's load.

Figure 5:
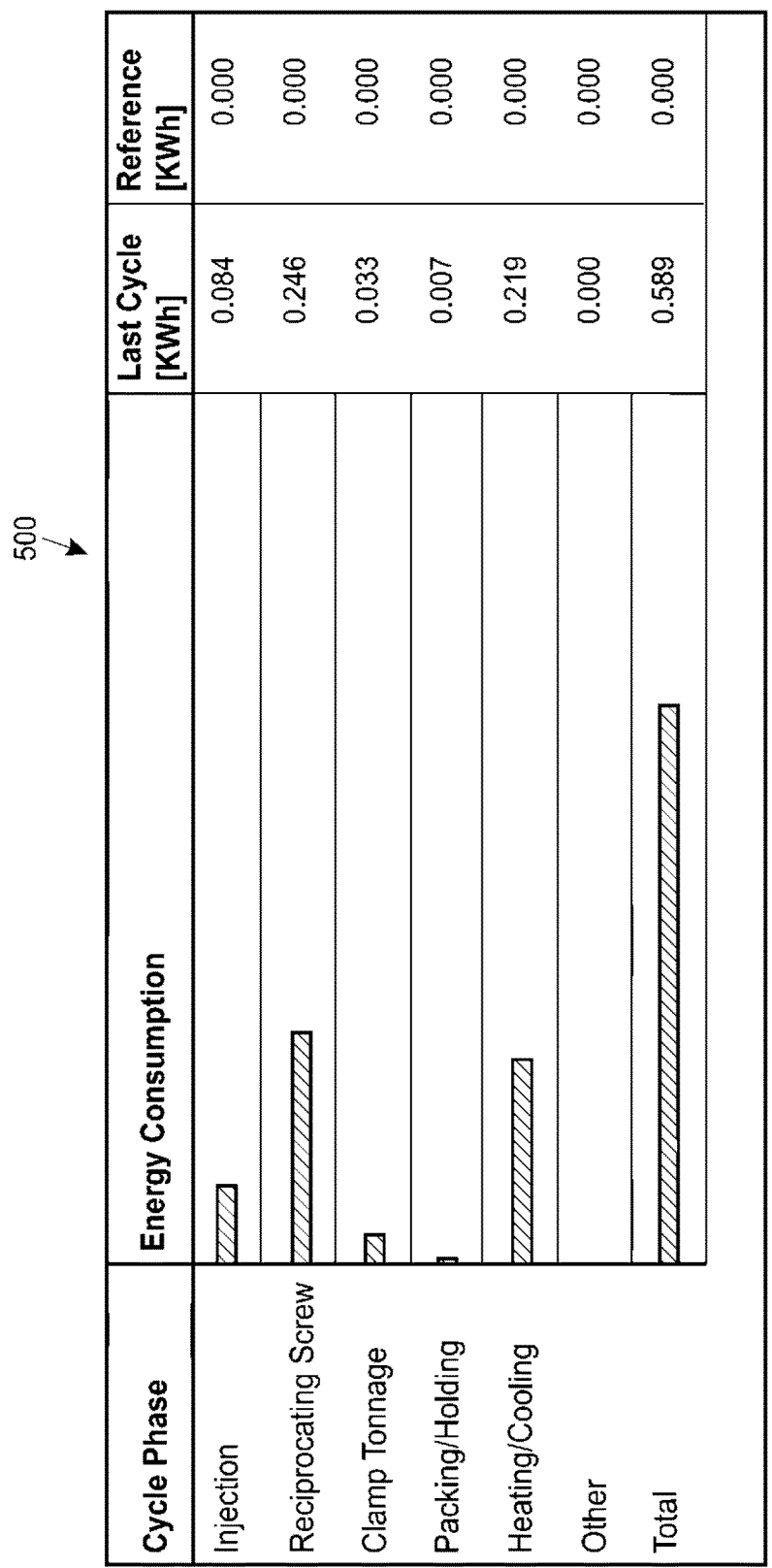
FIG. 5 illustrates an exemplary screenshot of a controller providing periodically updated operating values of a number of parameters in accordance with various embodiments of the present disclosure.
Figure 6A:
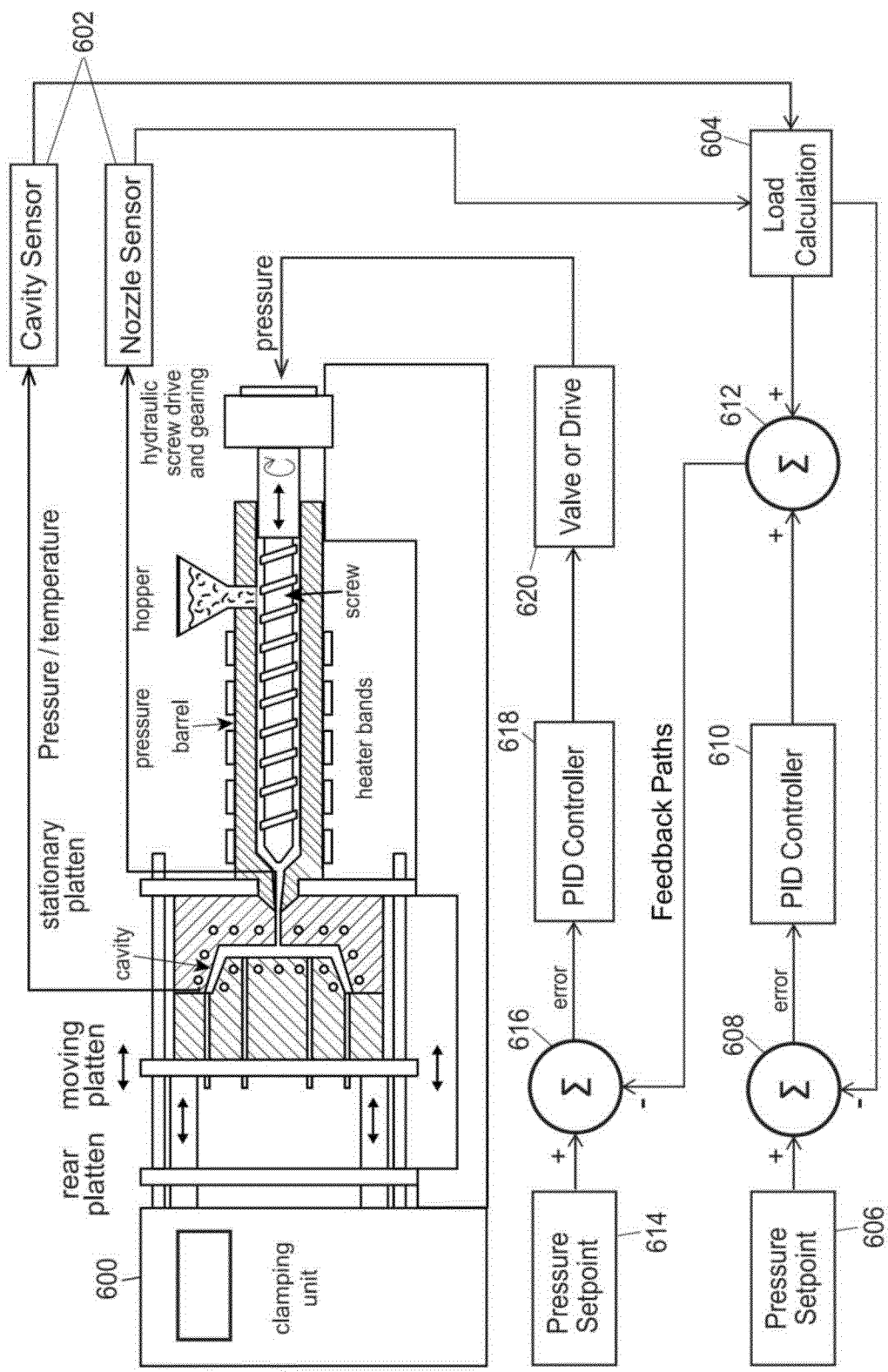
Figure 6B:
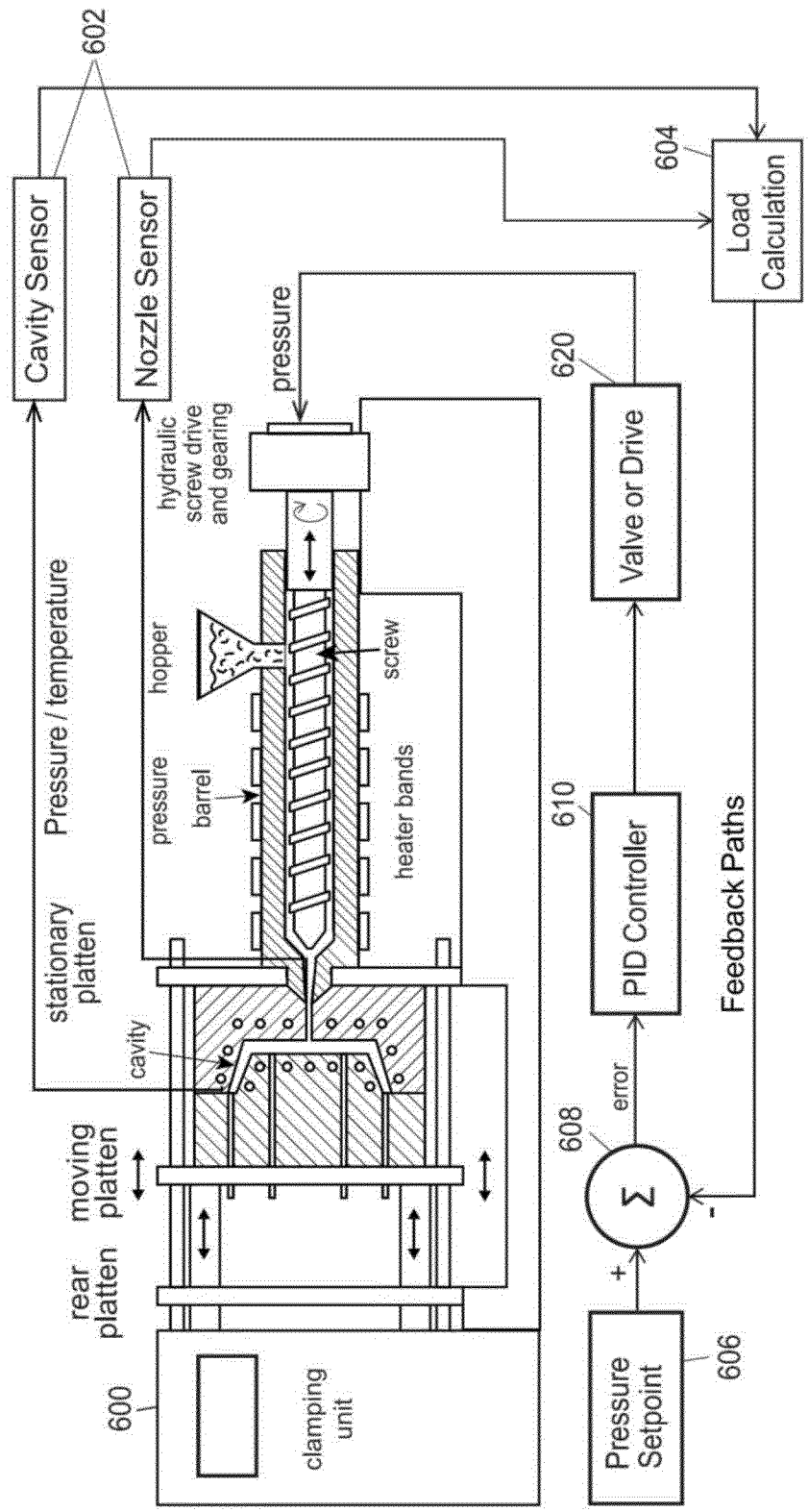

An exemplary operating screen or display 500 of the native controller 140 and/or the retrofit controller 150 is illustrated in FIG. 5. The native controller 140 and/or the retrofit controller 150 may sense, determine, calculate, and/or display information relating to operation of the machine 100 in a graphical manner to allow an operator to identify how the machine 100 is currently operating. The native controller 140 and/or the retrofit controller 150 may also store historical data for the operator to review at a later date and to perform any number of analytical calculations. The display 500 may provide energy consumption metrics for different phases of the injection molding cycle, and may sum this information to provide a total load value.

In some embodiments, the retrofit controller 150 may incorporate any number of approaches to providing periodic, accurate tracking and/or adjusting of machine parameters in real or near-real time. For example, the retrofit controller 150 may incorporate feedback control components and/or systems which compare real-time sensed operating values with anticipated operating values and applying corrective action to compensate for the difference between the sensed values.

In some examples, the retrofit controller 150 may be a closed loop controller which provides feedback and trim control during the mold cycle. The feedback trim control provides modification to both steady-state response and control system dynamics. By altering the feedback signal of the control system (e.g., adding and/or subtracting a PID controlled trim signal), either the native controller 140 and/or the retrofit controller 150 may perform the desirable process. Any number of feedback controllers and/or systems known those having skill in the art may be used.

Figure 6A:
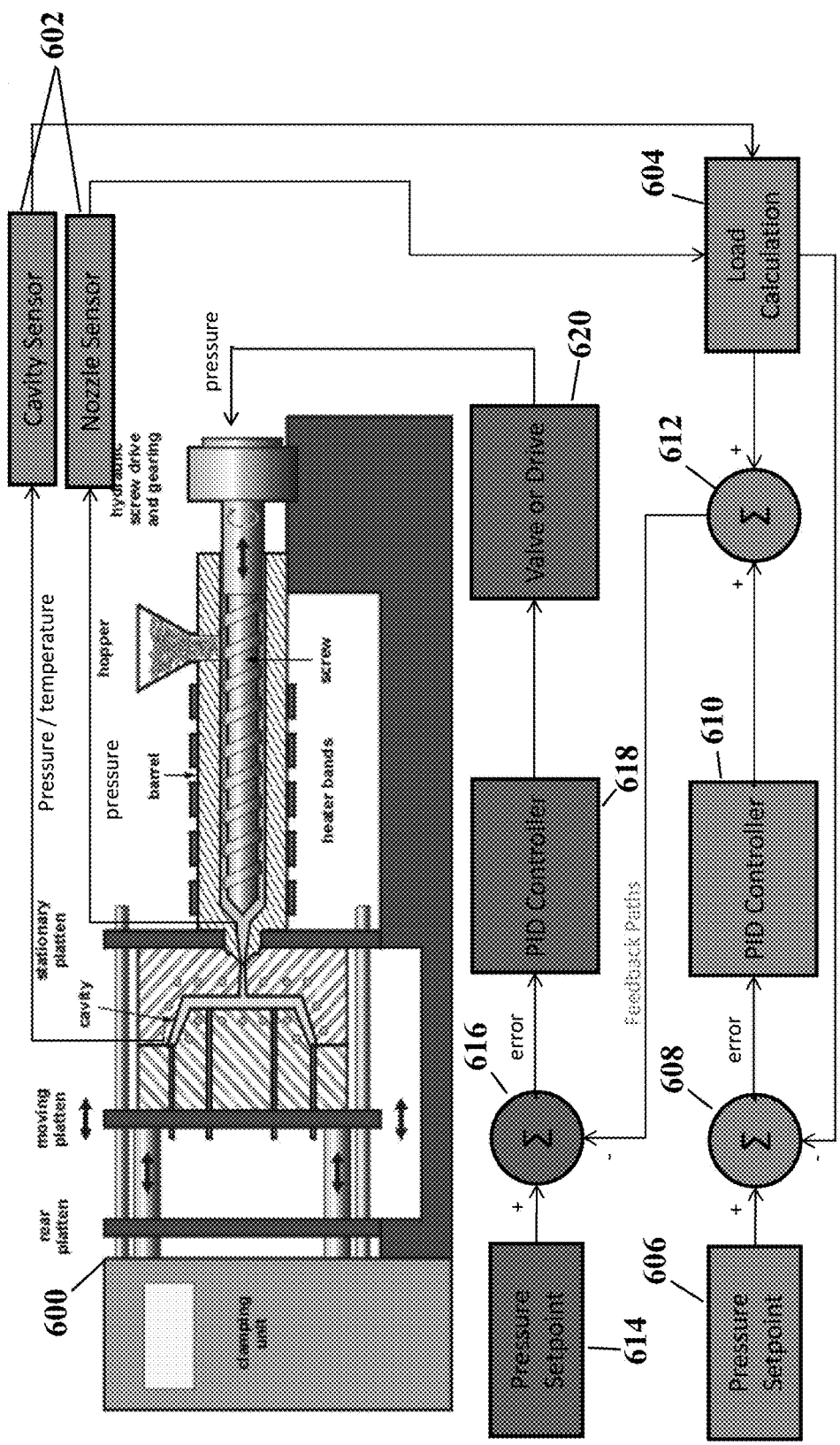
FIG. 6A illustrates exemplary schematics of a control process of an electric injection molding machine in accordance with various embodiments of the present disclosure.
Figure 6B:
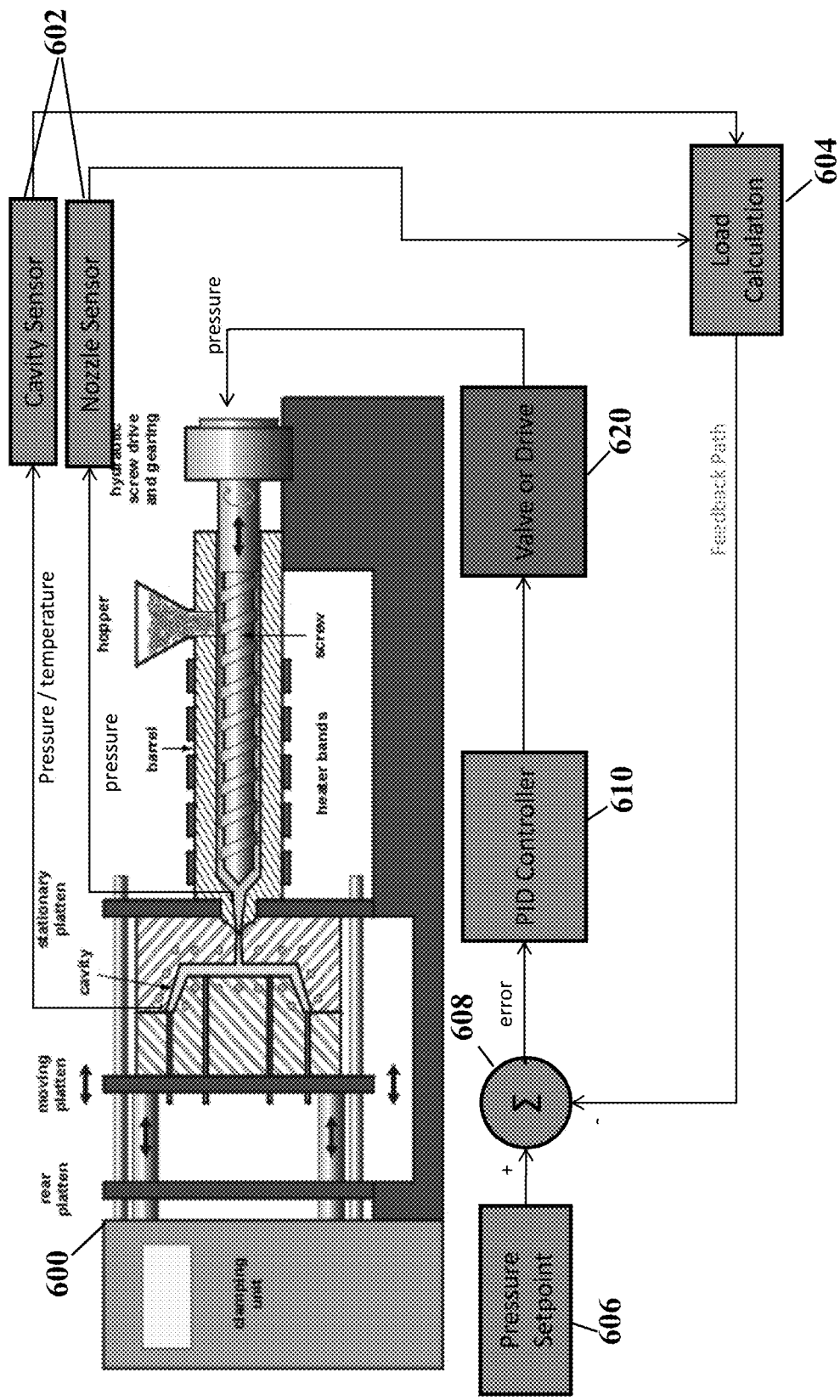
FIG. 6B illustrates exemplary schematics of a control process of a hydraulic injection molding machine in accordance with various embodiments of the present disclosure.
Figure 1:
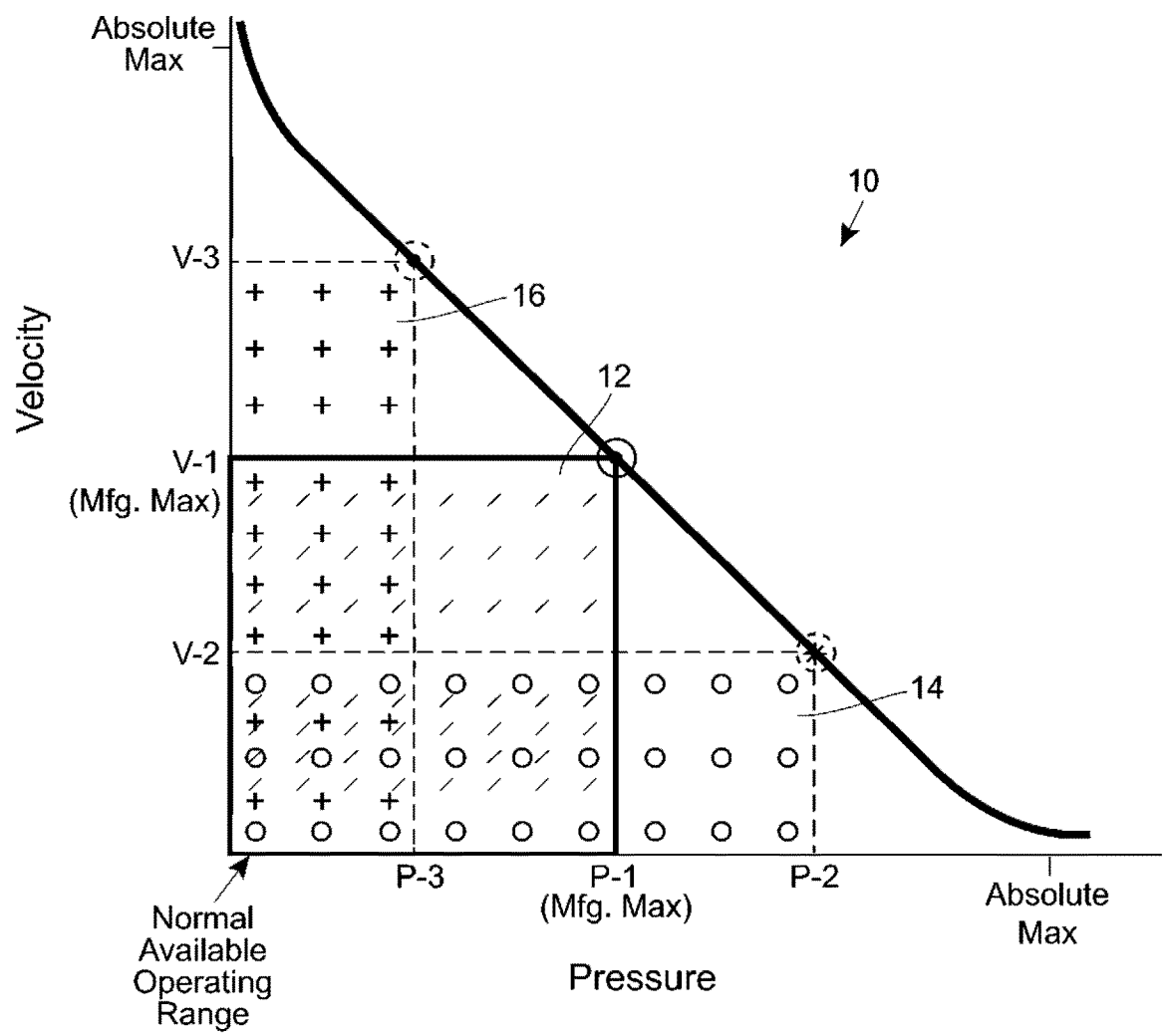
Figure 4:
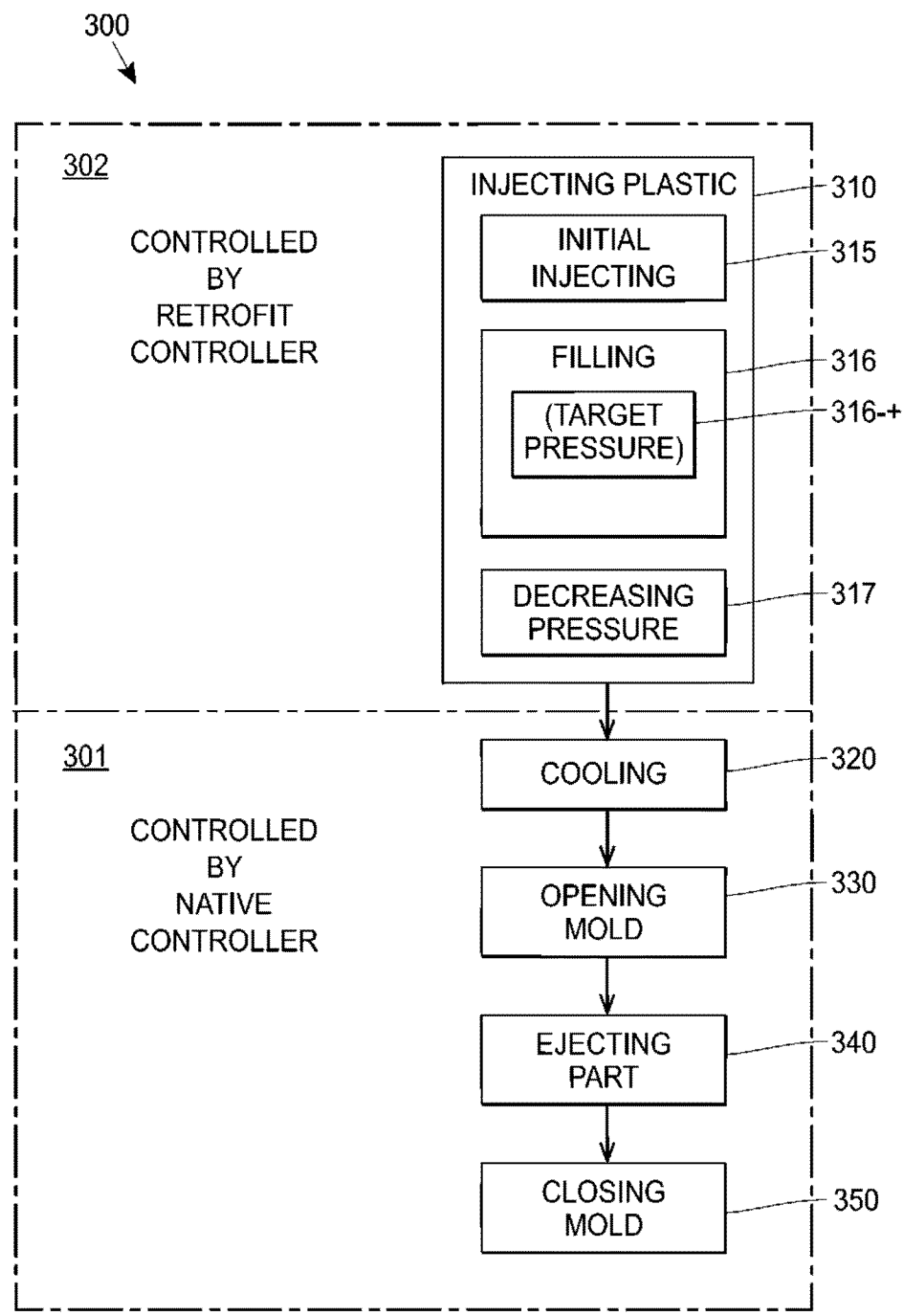

As a non-limiting example and as illustrated schematically by FIGS. 6A and 6B, the retrofit controller 150 may be adapted to include feedback control (e.g., a trim control process as illustrated by FIG. 6A) which can include a number of components coupled to the injection molding machine 600 via any number of electrical coupling approaches. The feedback control may be applied to any machine configuration, including electric, hydraulic, servo-hydraulic, servo-driven, and any other configurations. In addition to the components of the injection molding machine 600 previously described herein with regard to the preceding figures, the process may utilize any number of sensors 602 (e.g., a cavity sensor and a nozzle sensor), a load calculation module 604, a first pressure setpoint 606, a first summer 608, a first PID controller 610, a second summer 612, a second pressure setpoint 614 (which may be equal in value to that of the first pressure setpoint 606), a third summer 616, a second PID controller 618, and a valve or drive 620. Any number of additional components used in feedback control processes may also be used to provide control. Further, the native controller may supply the retrofit controller with any number of sensed values not illustrated in FIGS. 6A and/or 6B.

As illustrated in FIG. 6A, the sensor and/or sensors 602 transmit a signal to the load calculation module 604 to determine the current operational load value. This value is transmitted to the first summer 608 which compares the value to the first pressure setpoint 606 and generates an error signal to be transmitted to the first PID controller 610. The first PID controller 610 then generates a load signal and transmits the signal to the second summer 612, which compares the signal to the current operational load value. The second summer 612 generates a voltage signal indicative of an operating pressure based on the received signals, and is compared to the second pressure setpoint 614 value at the third summer 616. Depending on the machine, the system environment, and additional factors, the process may transmit signals at different voltage scales. For example, the signals may range between 4-20 mV, −10-10V, 0-10V, and any other suitable range. In some embodiments, the signal ranges may also vary based on the type of signal being measured (e.g., a temperature, pressure, and/or position measurement). An error signal is again sent to the second PID controller, which generates a voltage signal representative of a valve position for the valve or drive 620. Upon receiving this signal, the valve 620 adjusts and transmits a pressure to the injection molding machine 600 for operation.

The process illustrated schematically in FIG. 6B depicts the use of a control loop in an exemplary standard (e.g., hydraulic) press and differs from the process in FIG. 6A in that a single control loop is used to determine and cause modifications to the system. In these machines, the feedback loop may be different from the control used in an electric process. Some considerations when controlling a hydraulic press include additional contributing factors on the load such as hydraulic pressure (including the pressure in hoses, valves, and other components), oil temperatures (where, in some examples, the hybrid press may shut down due to overloading), and a PID tuning rate. Other examples are possible.

In FIG. 6B, the sensor and/or sensors 602 transmit a signal to the load calculation module 604 to determine the current operational load value. This value is transmitted to the summer 608 which compares the value to the pressure setpoint 606 and generates an error signal to be transmitted to the PID controller 610. The PID controller then generates a voltage signal representative of a valve position for the valve or drive 620. Upon receiving this signal, the valve 620 adjusts and transmits a pressure to the injection molding machine 600 for operation. In some examples, the controller may adjust the dwell, cooling, and/or eject timing prior to adjusting valve pressure.

In some approaches, parameters of the injection molding machine 100 may be adjusted in any number of ways to effectuate a change to the current operational load. For example, changes may be made to a barrel temperature, a clamp closing speed, a clamp opening speed, a cooling time, an inject forward time, an overall cycle time, a pressure setpoint, a screw recovery speed, and/or a screw velocity to adjust the current operational load. Changing any and/or all of these parameters may have an effect on the operational load, thus there may be countless approaches to modifying these parameters to accomplish an increase or decrease in the operational load value.

For example, in some embodiments, by decreasing the barrel temperature, the machine's loading increases, as, for example, the lower barrel temperature may result in relatively higher viscosity of the molten polymeric material to be injected into the mold cavity. By decreasing the clamp closing and opening speed, the operational load value will decrease. By decreasing the cooling (or dwell) time, the operational load value will increase. By decreasing the inject forward time (e.g., fill and pack times), the pressure setpoint, screw recovery speed, and screw velocity, the machine's loading values will decrease. By decreasing the overall cycle time, the machine's loading will increase. For any of the above examples, increasing the parameter may result in an opposite effect on the machine's loading. Other examples of parameters which may be adjusted are possible. The software 151 of the retrofit controller 150 is adapted to selectively adjust any number of these parameters to increase or decrease the load value as desired to keep the current operational load within the desired range.

While the examples described herein involve the use of a native and a retrofit controller capable of being adjusted according to a number of discrete set points, an original equipment manufacturer (OEM) injection molding machine can alternately be programmed in such a manner. In other words, the "native" controller can be programmed to determine a number of set points located outside of a typical operating parameter or parameters. As such, a machine can be provided with such an operating functionality preinstalled. Appropriate sizing parameters of such OEM systems must be determined based on the critical design elements previously described herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present disclosure. To the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

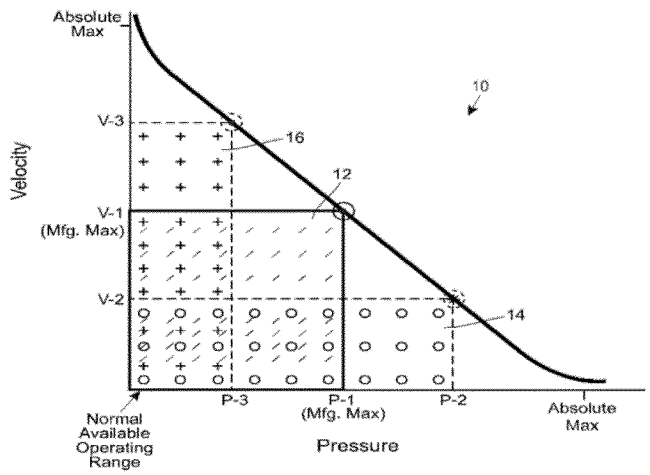

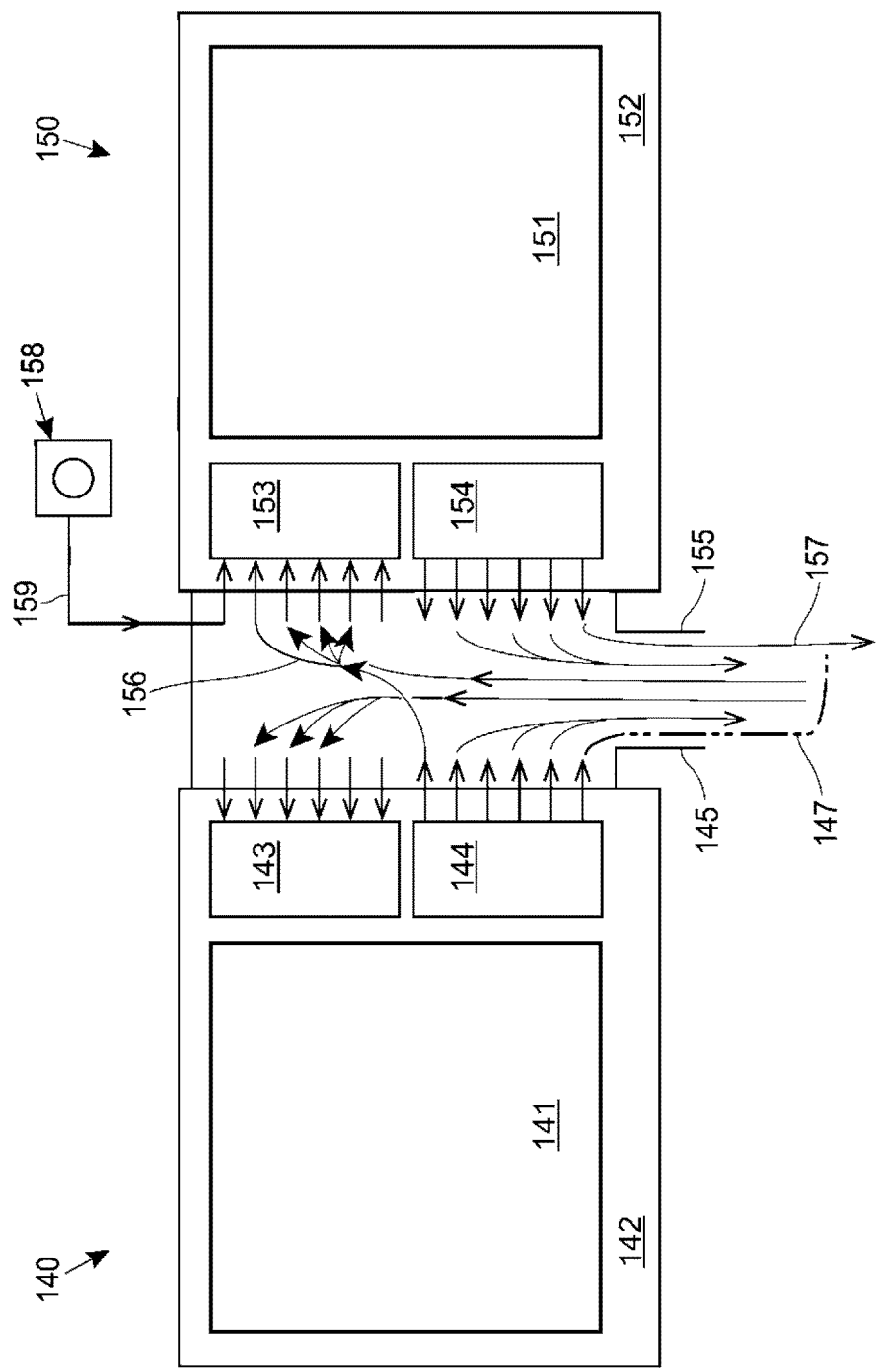

What is claimed is:

1. A method of operating an injection molding machine, the method comprising:
providing an injection molding machine having a controller adapted to control operation thereof;
entering a learning mode of the controller to obtain a reference load curve;
upon obtaining the reference load curve, obtaining a plurality of set points along the reference load curve;
upon obtaining the reference load curve and the plurality of set points, entering an operational mode of the controller; and
using the controller, operating the injection molding machine at one of the plurality of set points such that an average operational load value of the injection molding machine remains at or below the reference load curve.

2. The method of claim 1, wherein the reference load curve is obtained by calculating an initial load value of the injection molding machine based on a first set of operating parameters and calculating a modified load value of the injection molding machine by operating the injection molding machine based on a second set of operating parameters.

3. The method of claim 2, wherein the initial load value is calculated by sensing at least one of a nozzle pressure, injection pressure, screw velocity, and voltage over a predetermined per-cycle period of time and calculating a load value using the sensed data.

4. The method of claim 2, wherein the modified load value is calculated by sensing at least one of a nozzle pressure, injection pressure, screw velocity, and voltage over a predetermined per-cycle period of time and calculating a load value using the sensed data.

5. The method of claim 1, wherein the reference load curve is obtained by manually inputting values into a computer interface.

6. The method of claim 1, wherein the plurality of set points are determined by obtaining at least one critical design operating pressure element, obtaining at least one critical design operating velocity element, and defining the plurality of set points between the at least one critical design operating pressure element and the at least one critical design operating velocity element.

7. The method of claim 6, wherein the plurality of set points comprise five values equally distributed along the reference load curve.

8. The method of claim 1, wherein selectively operating the injection molding machine comprises selectively adjusting at least one of barrel temperature, clamp closing speed, clamp opening speed, cooling time, inject forward time, overall cycle time, pressure setpoint, screw recovery speed, and screw velocity.

9. The method of claim 1, wherein the controller comprises a closed loop controller adapted to permit the injection molding machine unit to operate within 50% of a given reference load value.

10. The method of claim 1, wherein the first set of operating parameters and the second set of operating parameters comprise adjustments to at least one of barrel temperature, clamp closing speed, clamp opening speed, cooling time, inject forward time, overall cycle time, pressure setpoint, screw recovery speed, and screw velocity.

11. The method of claim 1, wherein the reference load curve provides an estimated maximum load value maintainable by the injection molding machine while avoiding failure.

12. The method of claim 1, wherein at least one of the initial load value, the modified load value, and the operational load value is calculated by at least one a root-mean-square load calculation and a maximum machine capacity load calculation.

13. A discretely-adjustable injection molding system comprising:
an injection molding machine comprising an injection unit and a mold forming a mold cavity, the injection unit adapted to receive and inject a molten plastic material into the mold cavity to form a molded part;
one or more sensors coupled to the injection molding machine; and a controller coupled to the injection molding machine and the one or more sensors, the controller adapted to control operation of the injection molding machine;

wherein the controller is adapted to:
enter a learning mode to obtain a reference load curve using the one or more sensors;
obtain a plurality of set points along the reference load curve;
enter an operational mode; and
operate the injection molding machine at one of the plurality of set points such that an average operational load value of the injection molding machine remains at or below the reference load curve.

14. The discretely-adjustable injection molding system of claim 13, wherein the controller obtains the reference load curve by calculating an initial load value of the injection molding machine based on a first set of operating parameters and calculating a modified load value of the injection molding machine by operating the injection molding machine based on a second set of operating parameters.

15. The discretely-adjustable injection molding system of claim 13, wherein the controller comprises a computer interface that obtains the reference load curve via a plurality of manually inputted values.

16. The discretely-adjustable injection molding system of claim 13, wherein the controller comprises a closed loop controller adapted to permit the injection molding machine unit to operate within 50% of a given reference load value.

* * * * *

UNITED STATES PATENT AND TRADEMARK OFFICE
CERTIFICATE OF CORRECTION

| | | |
|---|---|---|
| PATENT NO. | : 10,427,342 B2 | |
| APPLICATION NO. | : 15/692467 | |
| DATED | : October 1, 2019 | |
| INVENTOR(S) | : Gene Michael Altonen et al. | |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIGS. 1 and 3-6B with FIGS. 1 and 3-6B as shown on the attached pages.

In the Claims

At Column 18, Line 57, "one a" should be -- one of a --.

Signed and Sealed this
Thirty-first Day of May, 2022

Katherine Kelly Vidal
*Director of the United States Patent and Trademark Office*

(12) United States Patent
Altonen et al.

(10) Patent No.: US 10,427,342 B2
(45) Date of Patent: *Oct. 1, 2019

(54) INJECTION MOLDING SYSTEM WITH DISCRETELY-ADJUSTABLE VARIABLE CONTROL

(71) Applicant: IMFLUX INC., Hamilton, OH (US)

(72) Inventors: Gene Michael Altonen, Hamilton, OH (US); Brian Matthew Burns, Mason, OH (US); H. Kenneth Hanson, III, Cincinnati, OH (US)

(73) Assignee: IMFLUX INC., Hamilton, OH (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/692,467

(22) Filed: Aug. 31, 2017

(65) Prior Publication Data

US 2018/0056567 A1 Mar. 1, 2018

Related U.S. Application Data

(60) Provisional application No. 62/382,335, filed on Sep. 1, 2016.

(51) Int. Cl.
*B29C 45/76* (2006.01)
*B29C 45/77* (2006.01)

(52) U.S. Cl.
CPC ............ *B29C 45/76* (2013.01); *B29C 45/766* (2013.01); *B29C 45/77* (2013.01);
(Continued)

(58) Field of Classification Search
CPC ......... B29C 45/03; B29C 45/76; B29C 45/77; B29C 2945/76006; B29C 2945/76033; B29C 2945/76066; B29C 2945/7611
(Continued)

(56) References Cited

U.S. PATENT DOCUMENTS 5,062,785 A * 11/1991 Stroud, III ............. B29C 45/76 264/40.5
5,182,716 A * 1/1993 Stroud, III ............. B29C 45/76 264/40.5
(Continued)

FOREIGN PATENT DOCUMENTS

DE 102013111257 B3 8/2014
EP 0531532 A1 3/1993
(Continued)

OTHER PUBLICATIONS

International Application No. PCT/US2017/049632, International Search Report and Written Opinion, dated Nov. 17, 2017.
(Continued)

*Primary Examiner* — Jacob T Minskey
*Assistant Examiner* — Cedrick S Williams
(74) *Attorney, Agent, or Firm* — Marshall, Gerstein & Borun LLP

(57) ABSTRACT

An injection molding machine uses a controller to effectively control its operation. The controller may determine and/or receive information regarding the machine's maximum load capacity, and may also determine a current operational load value of the machine. The controller also may determine a number of set points used to operate the machine. The controller may cause the machine to operate at these set points, thereby resulting in the machine operating at or below the maximum load value by adjusting any number of machine parameters associated with the injection molding machine.

16 Claims, 7 Drawing Sheets